US012647186B2

(12) United States Patent
Frankel et al.

(10) Patent No.: US 12,647,186 B2
(45) Date of Patent: Jun. 2, 2026

(54) ADJUSTABLE BANDWIDTH CURRENT-TO-VOLTAGE CONVERTER THAT OPERATES IN A DYNAMIC LOAD MODE OR IN AN INTEGRATE-AND-DUMP MODE FOR USE IN AN OPTICAL RECEIVER

(71) Applicant: Ciena Corporation, Hanover, MD (US)

(72) Inventors: Michael Y. Frankel, Hallandale Beach, FL (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 254 days.

(21) Appl. No.: 18/425,628

(22) Filed: Jan. 29, 2024

(65) Prior Publication Data

US 2025/0247156 A1      Jul. 31, 2025

(51) Int. Cl.
*H04B 10/61* (2013.01)
*H04B 10/071* (2013.01)

(52) U.S. Cl.
CPC ......... *H04B 10/616* (2013.01); *H04B 10/071* (2013.01)

(58) Field of Classification Search
CPC ............................ H04B 10/616; H04B 10/071
USPC .......................................................... 398/37
See application file for complete search history.

(56) References Cited

U.S. PATENT DOCUMENTS

| | | |
|---|---|---|
| 6,243,175 B1 | 6/2001 | Pelekhaty |
| 6,795,607 B1 | 9/2004 | Archambault et al. |
| 7,184,215 B2 | 2/2007 | Pelekhaty |
| 7,415,208 B1 | 8/2008 | Haggans et al. |
| 7,853,156 B2 | 12/2010 | Grigoryan et al. |
| 7,853,157 B2 | 12/2010 | Grigoryan et al. |
| 8,005,375 B2 | 8/2011 | Frankel |
| 8,625,994 B2 | 1/2014 | Archambault et al. |
| 8,699,880 B2 | 4/2014 | Grigoryan et al. |
| 8,977,125 B2 | 3/2015 | Grigoryan et al. |
| 9,191,117 B2 | 11/2015 | Alexander et al. |
| 9,270,405 B2 | 2/2016 | Blair et al. |
| 9,374,166 B2 | 6/2016 | Mateosky et al. |

(Continued)

FOREIGN PATENT DOCUMENTS

| | | | | |
|---|---|---|---|---|
| CN | 101917226 A | * | 12/2010 | ........... H04B 10/071 |
| CN | 108879305 A | * | 11/2018 | ......... H01S 3/06754 |
| CN | 209151171 U | * | 7/2019 | |

OTHER PUBLICATIONS

Atef et al; 10Gb/s Inverter Based Cascade Transimpedance Amplifier in 40nm CMOS Technology ; 2013, IEEE, pp. 1-4. (Year: 2013).*

(Continued)

*Primary Examiner* — Amritbir K Sandhu
(74) *Attorney, Agent, or Firm* — Baratta Law PLLC; Lawrence A. Baratta, Jr.

(57) ABSTRACT

An adjustable bandwidth current-to-voltage converter for use in an optical receiver includes an input configured to receive current from a photodetector; an amplifier stage connected to the input; a feedback path connected to the amplifier stage and to an output, wherein the feedback path includes a feedback element and an operating mode switch configured to set one of photodetector amplifier with dynamic load (PADL) mode and an integrate-and-dump (I&D) mode. The PADL mode is for higher baud operation than the I&D mode.

20 Claims, 11 Drawing Sheets

(56) References Cited

U.S. PATENT DOCUMENTS

| | | | |
|---|---|---|---|
| 9,509,410 B2 | 11/2016 | Mateosky et al. | |
| 9,515,767 B2 | 12/2016 | Frankel et al. | |
| 9,551,836 B2 | 1/2017 | Frankel et al. | |
| 10,141,926 B2 | 11/2018 | Frankel et al. | |
| 10,142,092 B2 | 11/2018 | Pelekhaty et al. | |
| 10,171,169 B2 | 1/2019 | Frankel et al. | |
| 10,194,221 B2 | 1/2019 | Frankel et al. | |
| 10,200,305 B2 | 2/2019 | Frankel et al. | |
| 10,212,496 B2 | 2/2019 | Frankel et al. | |
| 10,313,014 B2 | 6/2019 | Frankel et al. | |
| 10,313,021 B1 | 6/2019 | Frankel et al. | |
| 10,404,365 B2 | 9/2019 | Frankel et al. | |
| 10,476,815 B2 | 11/2019 | Frankel et al. | |
| 10,715,888 B2 | 7/2020 | Swinkels et al. | |
| 10,749,602 B2 | 8/2020 | Charlton et al. | |
| 10,763,968 B1 * | 9/2020 | Li | H04B 10/40 |
| 11,026,001 B1 | 6/2021 | Frankel et al. | |
| 11,063,667 B1 | 7/2021 | Ritter | |
| 11,128,373 B1 | 9/2021 | Podmore et al. | |
| 2005/0100271 A1 | 5/2005 | Frankel | |
| 2007/0188740 A2 * | 8/2007 | Rosolem | H04B 10/071 |
| | | | 356/73.1 |
| 2012/0281740 A1 | 11/2012 | Fujita et al. | |
| 2013/0038865 A1 * | 2/2013 | McClean | G01M 11/3154 |
| | | | 356/73.1 |
| 2015/0229389 A1 * | 8/2015 | Kim | H04B 10/073 |
| | | | 398/17 |
| 2018/0269972 A1 | 9/2018 | Djordjevic et al. | |
| 2019/0028197 A1 | 1/2019 | Turner et al. | |
| 2019/0182180 A1 | 6/2019 | Frankel et al. | |
| 2020/0236064 A1 | 7/2020 | Frankel et al. | |
| 2021/0058685 A1 | 2/2021 | Frankel et al. | |
| 2021/0075746 A1 | 3/2021 | Frankel et al. | |
| 2022/0209868 A1 | 6/2022 | Frankel et al. | |
| 2025/0167884 A1 * | 5/2025 | Archambault | G01M 11/3118 |

OTHER PUBLICATIONS

Zuo et al; Power-efficient dual-rate optical transceiver; 2005, Optical Society of America; pp. 1-13. (Year: 2005).*

Alireza et al; Low-Power CMOS Receivers for Short Reach Optical Communication—2017; IEEE, pp. 1-8. (Year: 2017).*

Timothy et al; An Integrate-and-Dump Receiver for High Dynamic Range Photonic Analog-to-Digital Conversion ; 2012, IEEE, pp. 1-4. (Year: 2012).*

Qi Xiaogang et al., "A survey of routing techniques for satellite networks," Journal of Communications and Information Networks, vol. 1, No. 4, DOI: 10.11959/j.issn.2096-1081, 2016.058, Review Paper, Dec. 2016, pp. 67-85.

Agata Romanova et al., "A Review of Modern CMOS Transimpedance Amplifiers for OTDR Applications," Electronics 2019, 8, 1073, Published: Sep. 22, 2019, pp. 1-33.

Azita Emami-Neyestanak et al., "A 1dGb/s, 3 mW CMOS Receiver for Optical Communication," 7.2, 2002, Symposium on VLSI Circuits Digest of Technical Papers, pp. 84-87.

Timothy D. Gathman et al., "A 45-nm SOI CMOS Integrate-and-Dump Optical Sampling Receiver," IEEE Transactions on Circuits and Systems, Regular Paper, vol. 60, No. 2, Feb. 2013, pp. 469-478.

Michael Georges et al., "Addressing Link-Level Design Tradeoffs for Integrated Photonic Interconnects," 978-1-4577-0223-5/11/ IEEE, 2011, 8 Pages.

Michael Georges et al., "A Monolithically-Integrated Optical Receiver in Standard 45-nm SOI," IEEE Journal of Solid-State Circuits, vol. 47, No. 7, Jul. 2012, pp. 1693-1702.

Giles et al., "1 Gbit/s Integrate-And-Dump Filter for Digital Communication Systems," Electronic Letters, Feb. 2, 1989, vol. 25, No. 3, pp. 212-214.

Stefanos Sidiropoulos et al., "Current Integrating Receivers for High Speed System Interconnects," IEEE 1995 Custom Integrated Circuits Conference, pp. 107-110.

Renuka P. Jindal, Silicon MOS Amplifier Operation in the Integrate and Dump Mode for Gigahertz Band Lightwave Communication Systems, Journal of Lightwave Technology, vol. 8, No. 7, Jul. 1990, pp. 1023-1026.

Woorham Bae, "CMOS Inverter as Analog Circuit: An Overview," Journal of Low Power Electronics and Applications, MDPI, Published Aug. 20, 2019, pp. 1-15.

Samuel Palermo et al., "A 90 nm CMOS 16 Gb/s Transceiver for Optical Interconnects," IEEE Journal of Solid-State Circuits, vol. 43, No. 5, May 2008, pp. 1235-1246.

Eduard Säckinger, "The Transimpedance Limit," IEEE Transactions on Circuits and Systems, Regular Papers, vol. 57, No. 8, Aug. 2010, pp. 1848-1856.

* cited by examiner

R-feedback Inverter TIA

$$R_T = R_F$$

$$f_{-3dB} = \frac{1 + A}{2\pi R_F C_{PD}}$$

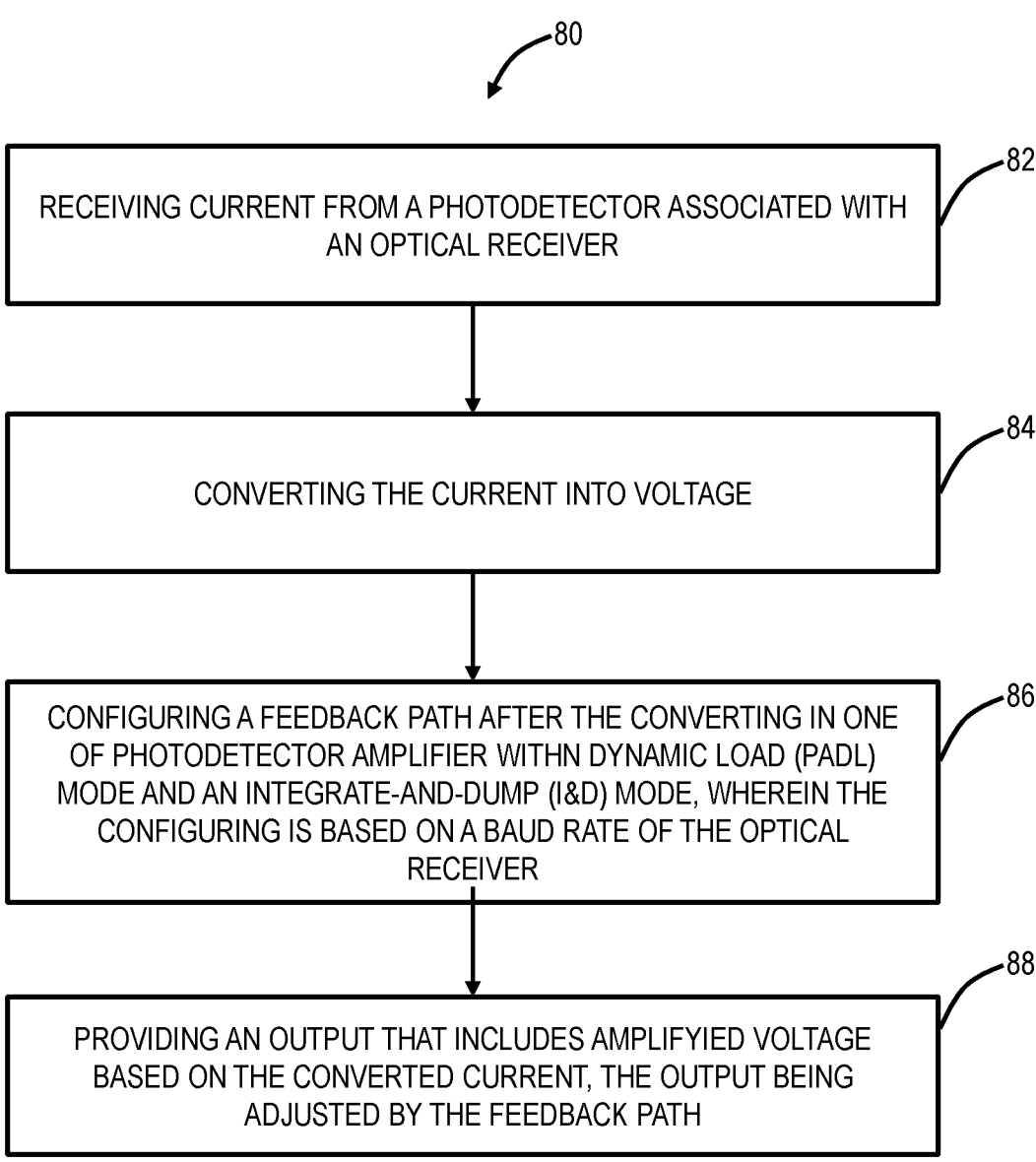

RECEIVING CURRENT FROM A PHOTODETECTOR ASSOCIATED WITH AN OPTICAL RECEIVER — 82

CONVERTING THE CURRENT INTO VOLTAGE — 84

CONFIGURING A FEEDBACK PATH AFTER THE CONVERTING IN ONE OF PHOTODETECTOR AMPLIFIER WITHN DYNAMIC LOAD (PADL) MODE AND AN INTEGRATE-AND-DUMP (I&D) MODE, WHEREIN THE CONFIGURING IS BASED ON A BAUD RATE OF THE OPTICAL RECEIVER — 86

PROVIDING AN OUTPUT THAT INCLUDES AMPLIFYIED VOLTAGE BASED ON THE CONVERTED CURRENT, THE OUTPUT BEING ADJUSTED BY THE FEEDBACK PATH — 88

_FIG. 11_

ADJUSTABLE BANDWIDTH CURRENT-TO-VOLTAGE CONVERTER THAT OPERATES IN A DYNAMIC LOAD MODE OR IN AN INTEGRATE-AND-DUMP MODE FOR USE IN AN OPTICAL RECEIVER

FIELD OF THE DISCLOSURE

The present disclosure relates generally to electrical circuits. More particularly, the present disclosure relates to an adjustable bandwidth current-to-voltage converter for use in an optical receiver.

BACKGROUND OF THE DISCLOSURE

In an optical receiver, such as in an optical networking system, there is a need to convert photocurrent from a photodetector into a voltage signal that is more useful for subsequent processing in electrical circuitry. The typical devices include photocurrent terminating resistor with converted voltage pre-amplifier and transimpedance amplifier (TIA). There are many different types of TIA designs, with basic principles of operation and various topologies discussed in Säckinger, Eduard, "Analysis and design of transimpedance amplifiers for optical receivers," John Wiley & Sons, 2017, the contents of which are incorporated by reference, with a more recent excellent review provided by Romanova, Agata, and Vaidotas Barzdenas, "A review of modern CMOS transimpedance amplifiers for OTDR applications," Electronics 8.10 (2019): 1073, the contents of which are incorporated by reference. TIA technical challenges are mainly related to the contradicting requirements of a typical TIA such as high-gain, large bandwidth and, at the same time, low input noise. Linearity and power consumption may also become more relevant for modern high-performance receivers. Conventional TIA designs have a fixed bandwidth and are not easily adjustable in terms of the bandwidth.

BRIEF SUMMARY OF THE DISCLOSURE

The present disclosure relates to an adjustable bandwidth current-to-voltage converter for use in an optical receiver. In particular, a circuit is presented which supports a wide range of bandwidth operation via switchable modes of operation between a photodetector amplifier with dynamic load (PADL) and an integrate-and-dump (I&D) receiver. The circuit can be used in a programmable optical receiver with highly adjustable operating bandwidth, as well as with high optical sensitivity at lower baud operation, where higher baud operation is not burdened by extra parasitics that accompany other approaches.

In an embodiment, a circuit for use in an optical receiver includes an input configured to receive current from a photodetector; an amplifier stage connected to the input; and a feedback path connected to the amplifier stage and to an output, wherein the feedback path includes a feedback element and an operating mode switch configured to set one of photodetector amplifier with dynamic load (PADL) mode and an integrate-and-dump (I&D) mode. The operating mode switch, in the PADL mode, can connect the feedback element to the output, and, in the I&D mode, can connect the feedback element to a clock signal which determines a sampling window. The clock signal can be synchronized to incoming data on the input. The feedback element can be a P-channel metal-oxide-semiconductor (PMOS) transistor or a N-channel metal-oxide-semiconductor (NMOS) transistor. The operating mode switch can be a complementary metal-oxide-semiconductor (CMOS) transmission gate. The amplifier stage can be a complementary metal-oxide-semiconductor (CMOS) inverter.

The PADL mode can be for higher baud operation than the I&D mode. The operating mode switch can be set based on a data rate of the optical receiver. The optical receiver can be in a satellite optical modem that is configured to operate over a wide range of data rate operation, such that the operating mode switch is set based on the data rate operation. The optical receiver can be in a terrestrial free space optical link having variable channel impairments, such that the operating mode switch is set based on the variable channel impairments. The optical receiver can be in an optical time domain reflectometer (OTDR) that operates over a range of optical sampling pulse widths, such that the operating mode switch is set based on the optical sampling pulse widths.

In another embodiment, an optical modem includes an optical front end configured to provide a current to an adjustable bandwidth current-to-voltage converter, the adjustable bandwidth current-to-voltage converter includes an amplifier stage configured to receive the voltage; and a feedback path connected to the amplifier stage and to an output, wherein the feedback path includes a feedback element and an operating mode switch configured to set one of a photodetector amplifier with dynamic load (PADL) mode and an integrate-and-dump (I&D) mode. The PADL mode can be for higher baud operation than the I&D mode. The operating mode switch can be set based on a data rate of the optical modem. The optical modem can be in a satellite and is configured to operate over a wide range of data rate operation, such that the operating mode switch is set based on the data rate operation. The optical modem can be in a terrestrial free space optical link having variable channel impairments, such that the operating mode switch is set based on the variable channel impairments. The optical modem can be in an optical time domain reflectometer (OTDR) that operates over a range of optical sampling pulse widths, such that the operating mode switch is set based on the optical sampling pulse widths.

In a further embodiment, a method includes steps of receiving current from a photodetector associated with an optical receiver; converting the current into voltage; configuring a feedback path after the converting in one of photodetector amplifier with dynamic load (PADL) mode and an integrate-and-dump (I&D) mode, wherein the configuring is based on a baud rate of the optical receiver; and providing an output that includes a voltage converted from current, the output being adjusted by the feedback path. The PADL mode can be for higher baud operation than the I&D mode.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a flowchart of a process for operating the dual-mode opto-electronic receiver circuit in an optical receiver.

DETAILED DESCRIPTION OF THE DISCLOSURE

Figure 1:
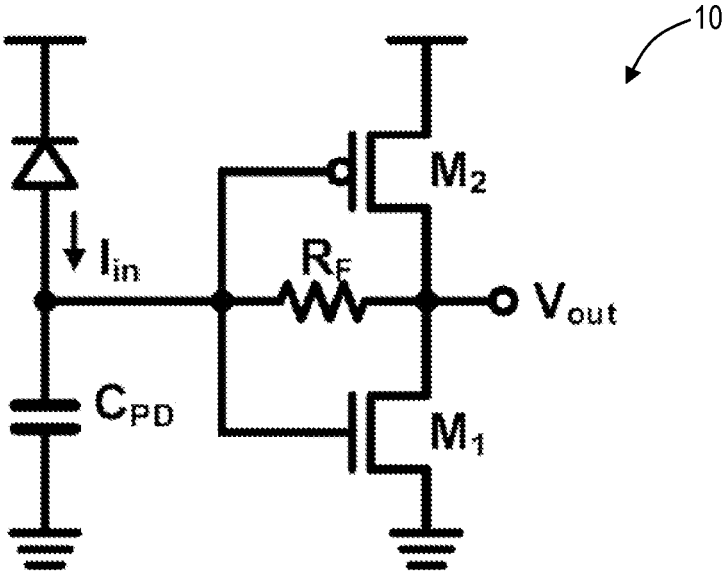
FIG. 1 is a circuit diagram of an inverter-based TIA with a simple feedback resistor RF.

Again, the present disclosure relates to an adjustable bandwidth current-to-voltage converter for use in an optical receiver.

In general, optical receiver bandwidth is fundamentally limited by photodetector capacitance, and a low enough trans-resistance TIA design is required (i.e., low resistance/capacitance (RC) time constant). At the same time, large amplifier gain is required (i.e., higher trans-resistance R) to ensure that sufficiently low photocurrents can be detected. TIA designs are limited by gain-bandwidth product and strive for simple circuits to increase bandwidth while minimizing noise sources.

The requirement for large amplifier gain and high bandwidth have resulted in TIA designs that are broadband, but where bandwidth cannot be easily adjusted. This has not been a large problem for fixed baud optical receivers—TIA operating frequency range is from low frequencies (near DC) up to ~0.8*Baud are typical. For example, TIAs designed for 25 GBaud would need ~20 GHz bandwidth, 50 GBaud would need ~40 GHz bandwidth, etc.

Modern programmable optical receivers, especially ones using coherent digital signal processors (DSP), may be designed to cover a selectable range of baud to adjust to network requirements. Signal radio frequency (RF) bandwidth needs to be limited to minimize noise power admitted into the decision circuitry. While it is possible to implement adjustable RF filtering in the DSP domain, it is beneficial to filter as early in the receiver chain as possible to minimize noise amplification, minimize power consumption, etc.

Conventional high-frequency (10's of GHz) TIA designs may use circuit elements such as transistors, varactors and such to provide voltage-tunable bandwidth, but are typically limited to ~20% range. For example, tunable between 30 to 40 GHz. Further, such tunable elements may penalize highest bandwidth operation which demands smallest circuit parasitics.

Recently, new applications have appeared that demand ultrawideband operation. These requirements cannot be covered by conventional bandwidth variable TIA designs.

(1) One example includes space-based optical links that require programmable switching between different orbit connections: geostationary equatorial orbit (GEO) (~35,000 km) to medium Earth orbit (MEO) (~10,000 km) and low Earth orbit (LEO) (~3000 km), and corresponding wide range of data rate operation (e.g. from 1 Gbps to 100 Gbps).

(2) Another example may be terrestrial Free Space Optical links that may undergo variable channel impairments.

(3) Another example may be terrestrial links that require a very large range of backward compatibility, for example for military applications that may have both modern and large legacy installed infrastructure.

(4) Another example may be optical time domain reflectometer (OTDR) applications which require operation over a wide range of optical sampling pulse widths, and which demand high sensitivity to detect backscattered light.

Of course, other examples are contemplated, namely any instrument that requires opto-electronic conversion with a wide range of data operation.

Problem Statement

There is a need for a circuit to perform current-to-voltage conversion for use in an optical receiver that simultaneously provides:

(1) Programmable bandwidth coverage from sub 1 GHz to many 10's of GHz.

(2) A simple, low-power circuit design.

(3) Has low parasitics in the path of high-bandwidth signals.

(4) A complementary metal-oxide-semiconductor (CMOS)-based design (preferable, but not strictly required).

Proposed Solution

The design includes a feedback-voltage controlled active dynamic load with a high-performance linear inverting amplifier stage, for example, a simple CMOS inverter along with a feedback path that uses a P-channel metal-oxide-semiconductor (PMOS) (or N-channel metal-oxide-semiconductor (NMOS)) transistor as active dynamic photocurrent load which is controlled by feedback voltage output from a high-performance linear inverting amplifier stage to provide a voltage-controlled current path in high-bandwidth operation. The same transistor (PMOS or NMOS) provides a sampling gate function when the circuit is switched to an Integrate-and-Dump mode of operation for supporting low data rates with very high receiver sensitivity.

Conventional Linear Photodetector Amplifiers

The straightforward manner of optoelectronic detection involves directing the current generated by source of a photocurrent, like a photodiode, through the termination resistor to the ground, which converts the photocurrent into voltage across termination resistor. This voltage is subsequently amplified by a pre-amplifier stage for the following conditioning and processing. This approach involves termination of photocurrent by passive resistor and pre-amplification of the resulting voltage converted by it.

There are various TIA designs with their trade-offs in bandwidth, gain, noise, power consumption, etc. Of particular direct relevance is an excellent description of CMOS inverter-based designs for linear amplifiers and TIA, see, e.g., Bae, Woorham. "CMOS inverter as analog circuit: An overview." Journal of Low Power Electronics and Applications 9.3 (2019): 26, the contents of which are incorporated by reference. Feedback can be provided by a simple resistor RF, or more complicated structures including peaking inductors, etc. FIG. 1 is a circuit diagram of an inverter-based TIA 10 with a simple feedback resistor RF.

Benefits of Integrate and Dump (I&D) Mode of Operation

Integrate-and-Dump receivers are known to provide substantially increased signal gain and sensitivity improvements over feedback type TIAs, such as in FIG. 1. These improvements are due to two facts:

(1) I&D receivers use an intrinsically noiseless capacitor to integrate signal charge, while conventional TIAs use resistive elements which are a source of intrinsic thermal noise. The smaller the integrating capacitor, the higher the "gain", i.e., $dV_{out}=I_{pd}/C*dt$ (2) I&D receivers provide a near-ideal matched filter function with negligible intersymbol interference, since they are not linear RF filters but rather use time-gated signal sampling.

A drawback of I&D is that performance is strongly limited by circuit parasitics—one needs very low input capacitance and a very fast "Dump" function. Designing and demonstrating an I&D receiver at 50 Gbaud would be extremely challenging due to circuit parasitics—this is why PADL mode is provided in the circuit design. However, 10 Gbaud and lower I&D may be quite practical, given current photonic integrated circuit (PIC) process design kit (PDK) and packaging technology. It is expected that I&D operating range will increase as PD's become more tightly coupled to the electronic front-end.

Details on I&D Performance

With an available clock at the receiver site, it becomes possible to take advantage of higher sensitivity of I&D optical receivers. They are known to be able to provide optimum signal-to-noise ratio (SNR), typically several dB better than other types of receivers, the nearest contender being a TIA-based one. The projected advantages of I&D receiver are twofold. First of all, it acts as I&D post-detection filter, which is known to have several advantages compared to a low pass filter (LPF), being it post-TIA LPF or frequency discriminating transfer function of the TIA itself. I&D filters can reduce the degradation caused by certain kinds of timing jitter and introduce very little intersymbol interference even at full bit time integration, which is equivalent to the tight noise filtering down to the half baud rate frequency.

Another advantage of I&D receiver over the TIA-based one stems from elimination of the noisy transimpedance resistor and most of the active components of the TIA front-end, hence reducing the amount of receiver electrical noise presented to the post-detection filter to begin with. Lower electrical noise levels of I&D receivers, combined with their extraordinary noise filtering capabilities make them an extra sensitive alternative to the more wasteful TIA-based implementation.

I&D receiver integrating photocurrent for a full bit period is an example of a matched filter optimized for detection of square wave pulses. This situation is typical for high-speed data transmission, where rise and fall time of a pulse comprises small portion of bit period, rendering this type of transmission as bandwidth excessive. Modern broadband optical communications use more bandwidth efficient pulse shaping due to bandwidth restrictions encountered at the frontier of spectral efficiency.

One of the most common representations of a bandwidth limited pulse is raised cosine shaped pulse with unity roll-off factor. With its 10%-90% rise/fall time constituting 60% of bit period it just manages the smooth transition between high and low voltage levels in one bit period.

Figure 2:
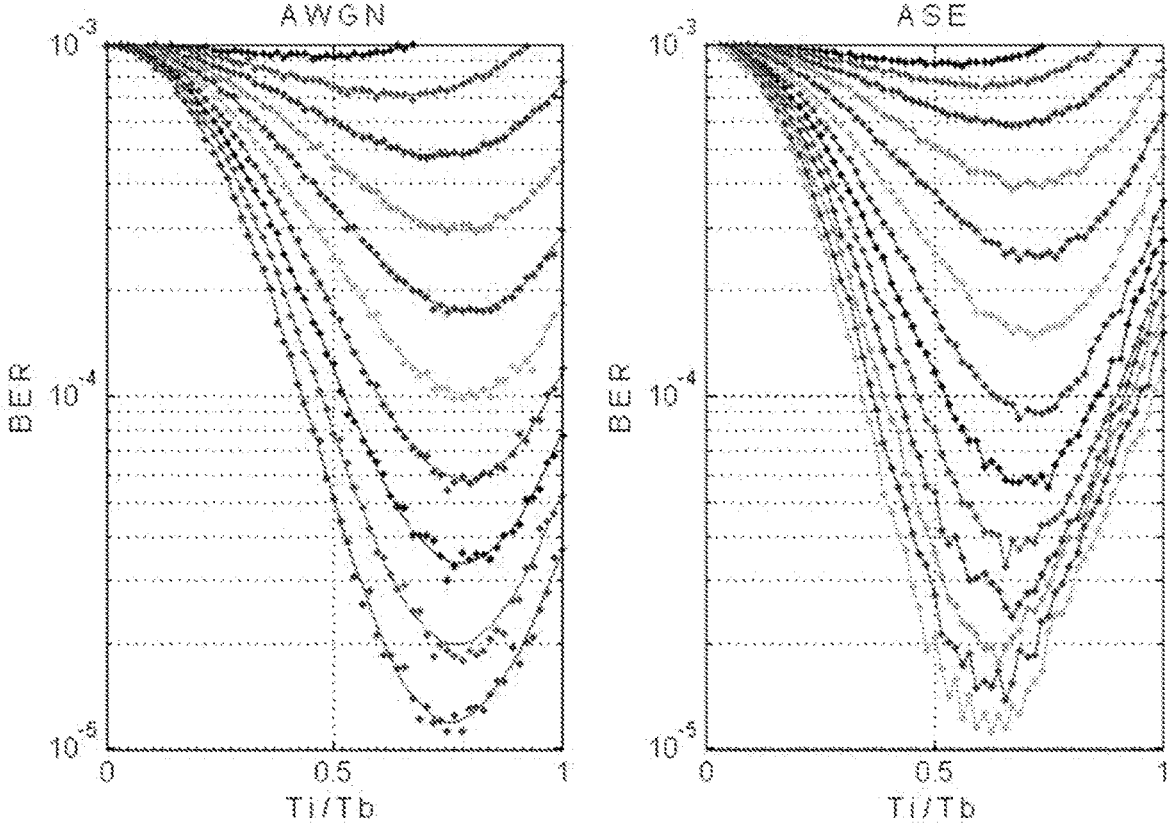
FIGS. 2A and 2B are graphs of bit error rate (BER) dependence from the integration time.

Being far from bandwidth excessive, optical multigigabit transmission raised cosine like pulses are not exactly optimal for the bit-time integration. To investigate the effect of the limited bandwidth and raised cosine shape of the multigigabit optical pulse on the filtering quality of the I&D receiver, bit error rate (BER) (FIGS. 2A and 2B) were calculated for additive white Gaussian noise and multiplicative optical ASE noise depending on which fraction of the bit period Tb integration time Ti constitutes. FIGS. 2A and 2B are graphs of bit error rate (BER) dependence from the integration time fraction. FIG. 2A is additive white Gaussian noise (AWGN) noise model which is Monte Carlo simulated (dots) and modeled analytically (solid lines), such as for a coherent receiver with a large local oscillator (LO). FIG. 2B is amplified spontaneous emission (ASE) noise model such as for a direct-detect receiver.

Noise levels were chosen so that very short integration time (Ti/Tb≈0; case of single sample at the center of the bit) results in benchmark BER=$10^{-3}$. Multiple curves are parameterized variable by the value of noise bandwidth. In case of AWGN noise bandwidth varies in 0.1 steps from 0.7 baud rate to 1.6 from top of the FIG. 2A to the bottom. It is clearly indicative that I&D receiver manages to eliminate excessive noise from under the bandwidth limited raised cosine shaped signal, all but with shorter optimal integration time equal about 75% of a bit period and never exceeding 80% of it. Multiplicative optical ASE noise in FIG. 2B is post-detection filtered with 0.7 baud rate through 1.9 baud rate wide electric LPF (similarly stepped 0.1 baud rate top to bottom). In this case optimal BER is achieved at shorter than bit period integration times.

Sensitivity advantages of I&D receivers become obvious when compared to state-of-art TIA designs. Since simple capacitive integrator followed by the buffer is taking place of the TIA front end and is assuming its functionality, the following voltage gain stages are similar to both I&D and TIA designs and their contribution to the signal corruption is identical. Hence comparison of the noise characteristics of TIA and I&D receivers will be limited to the electrical noise levels of the corresponding front-ends: TIA stage in case of TIA based receiver and buffer stage in case of I&D receiver.

Figure 3:
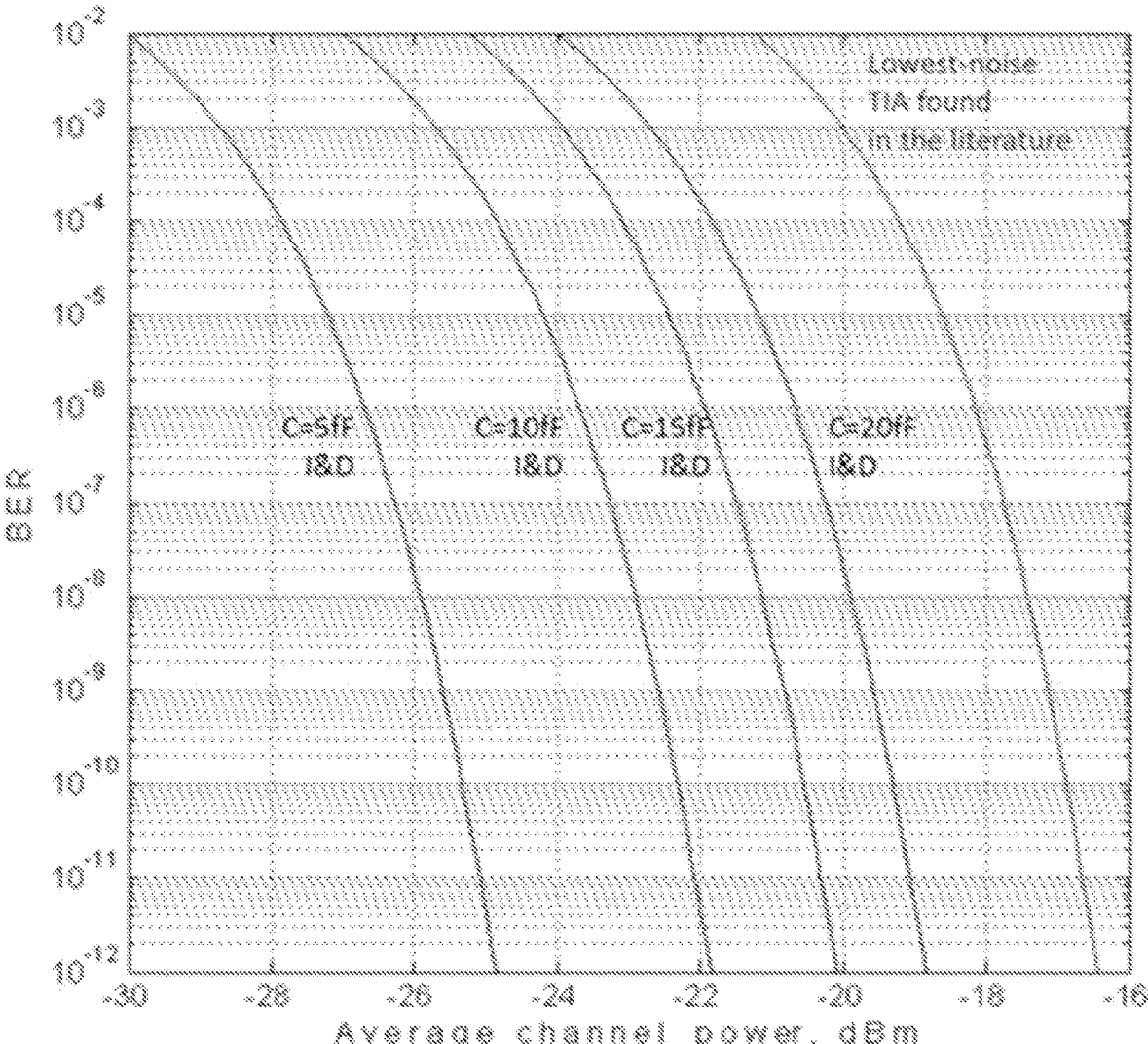
FIG. 3 is a graph of 28 Gbps non-return-to-zero (NRZ) BER versus average optical channel power for I&D.

Calculated BER versus average optical channel power is shown in FIG. 3 which is a graph of 28 Gbps non-return-to-zero (NRZ) BER versus average optical channel power for I&D (lines are photo-diode capacitance from left to right of 5 fF, 10 fF, 15 fF, and 20 fF along with the TIA receiver).

Proposed Design

Figure 4:
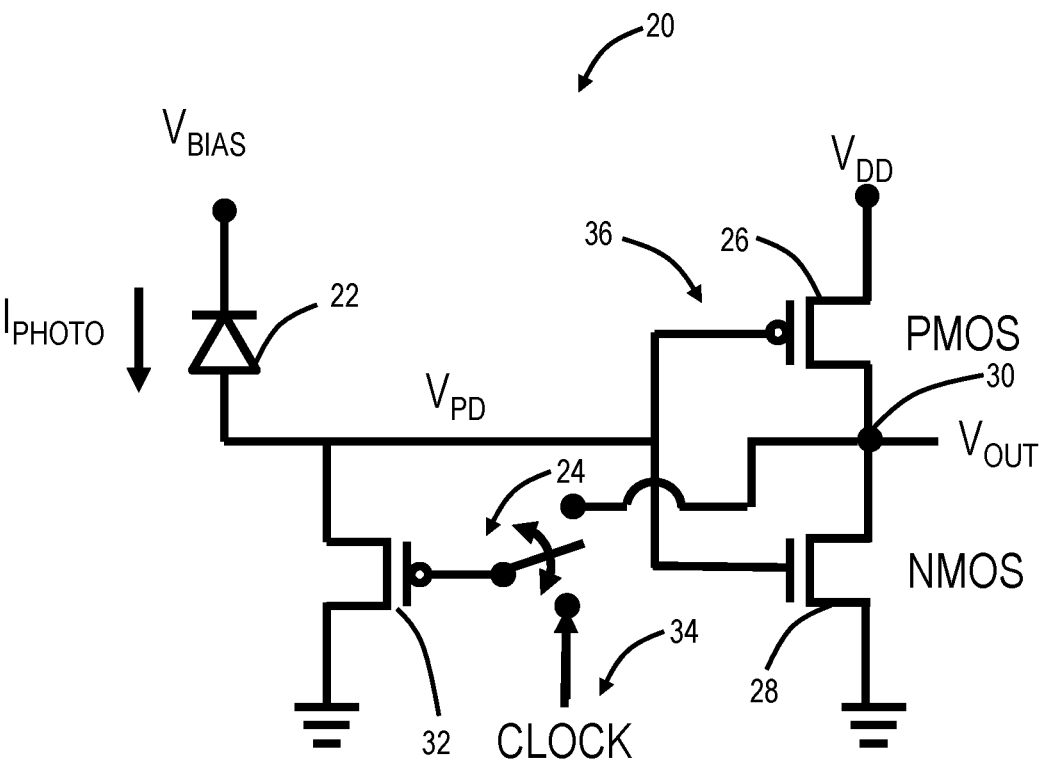
FIG. 4 is a circuit diagram of a dual-mode opto-electronic receiver circuit which is an adjustable bandwidth current-to-voltage converter for use in an optical receiver.

FIG. 4 is a circuit diagram of a dual-mode opto-electronic receiver circuit 20 which is an adjustable bandwidth current-to-voltage converter for use in an optical receiver. The opto-electronic receiver circuit 20 includes an input voltage ($V_{PD}$) from a photodetector which is caused by a photocurrent ($I_{PHOTO}$) loading an PMOS (or NMOS) transistor 32 instead of a passive resistor. The circuit 20 still relies on a high-performance linear inverting amplifier stage, for example, a conventional CMOS inverter 36 as an amplifier stage. However, feedback is implemented using the output voltage of a high-performance linear inverting amplifier stage to control an active dynamic load implemented as PMOS (or NMOS) transistor 32 instead of a passive resistor. Output voltage controls the conductance of the active dynamic load transistor and leaks into it (through the gate capacitance) a current waveform in the shape of the derivative of the output voltage, contributing to the sharpening of rising and falling transition edges. This boosts both the efficiency and the bandwidth of current-to-voltage conversion far beyond that of a passive resistor.

Compared to TIA, which converts the photocurrent to voltage by passing it though the passive feedback resistor, PADL utilizes CMOS transistor as an active dynamic load terminating the photocurrent to the ground. Voltage generated across the active dynamic load is subsequently amplified by voltage pre-amplifier, producing the output voltage similarly to TIA. Voltage output of both TIA and PADL is subsequently amplified and conditioned for further processing.

The circuit 20 is configured to operate in two different modes, namely a wideband photodetector amplifier with dynamic load (PADL) or an integrate-and-dump receiver, based on a setting of a virtual feedback path switch 24. As described herein, the mode is selected based on the required bandwidth. The circuit 20 further includes a PMOS transistor 26 connected to a voltage drain ($V_{DD}$) and an NMOS transistor 28 connected to ground. A voltage output ($V_{OUT}$) 30 is taken between the PMOS transistor 26 and the NMOS transistor 28.

The switch 24 can be implemented by standard CMOS transmission gate, which uses a parallel arrangement of NMOS and PMOS transistors. The switch 24 is configured to connect a gate of PMOS transistor 32 to either a clock signal 34 (for the I&D mode) or to the $V_{OUT}$ 30 (for PADL mode). That is, when the switch 24 is in the top position (connected to the $V_{OUT}$ 30), the circuit 20 functions as a wideband photodetector amplifier with dynamic load (PADL).

When the PMOS transistor 32 is switched to the clock signal 34 which is synchronized to the incoming data, the circuit 20 functions as an Integrate-and-Dump receiver, with the sampling window determined by the clock signal 34. Ultimately, the shortest possible sampling window is determined by the response of the PMOS transistor 32 which is a NMOS 'current dump' transistor. Therefore, precise frequency (or Baud) boundary between I&D and PADL modes is determined by the circuit 20 implementation and its component parameters.

Example Implementation and Results

Figure 5:
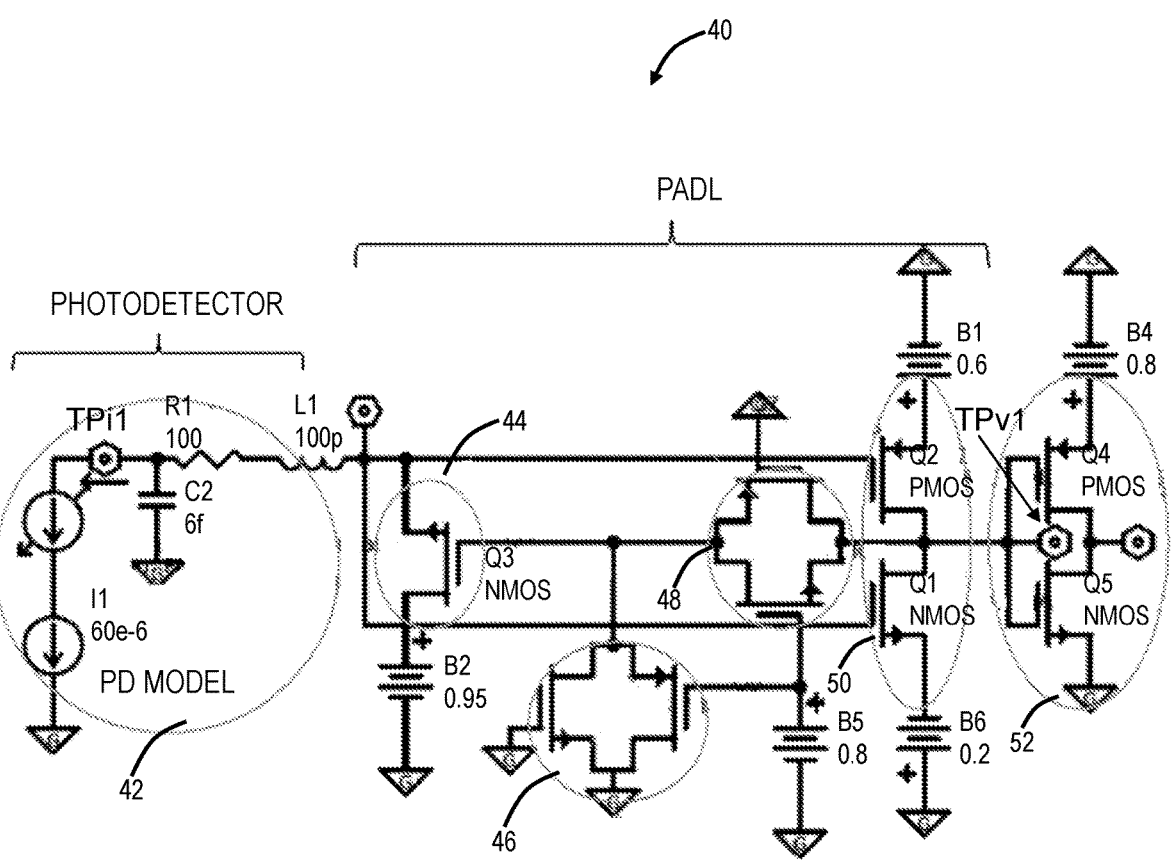
FIG. 5 is a circuit diagram of an example simulated circuit of the dual-mode opto-electronic receiver circuit, for illustrating PADL mode performance.

FIG. 5 is a circuit diagram of an example simulated circuit 40 of the dual-mode opto-electronic receiver circuit 20, for illustrating PADL mode performance. The circuit 40 includes a photodetector model 42, PADL sections 44, 46, 48, 50, and a buffer stage 52. The simulation was performed using an open-source Spice simulator and public domain 'generic' 22 nm CMOS transistor models to evaluate circuit performance. The photodetector model 42 is derived from a typical Si Photonics PDK for high-bandwidth photodetector. The PADL section includes an active photodetector dynamic load 44 (NMOS transistor Q3) which maps current to voltage by its conductance, a parallel arrangement of NMOS and PMOS transistors 46 (transmission gate), a parallel arrangement of NMOS and PMOS transistors 48 (transmission gate), and the output of linear inverting amplifier stage 50. The clock signal (not shown in this diagram) is applied to the NMOS and PMOS transistors 46 which are used to enact a low-pass I&D mode, while NMOS and PMOS transistors 48 are turned off. The NMOS and PMOS transistors 48 enact in the wideband PADL mode, while the NMOS and PMOS transistors 46 are turned off.

For the high-baud PADL mode, the simulated circuit 40 uses an NMOS dynamic load transistor. In an embodiment, the circuit 40 targets a PADL design for 28 GBaud operation. This could be used for 28 Gbps non-return-to zero (NRZ), 56 Gbps pulse amplitude modulation 4 (PAM4) or 100 Gbps Coherent quadrature phase-shift keying (QPSK) transmission formats. The PADL feedback transmission gate 48 is set to "ON" and the I&D Clock input transmission gate 46 to "OFF."

Figure 6:
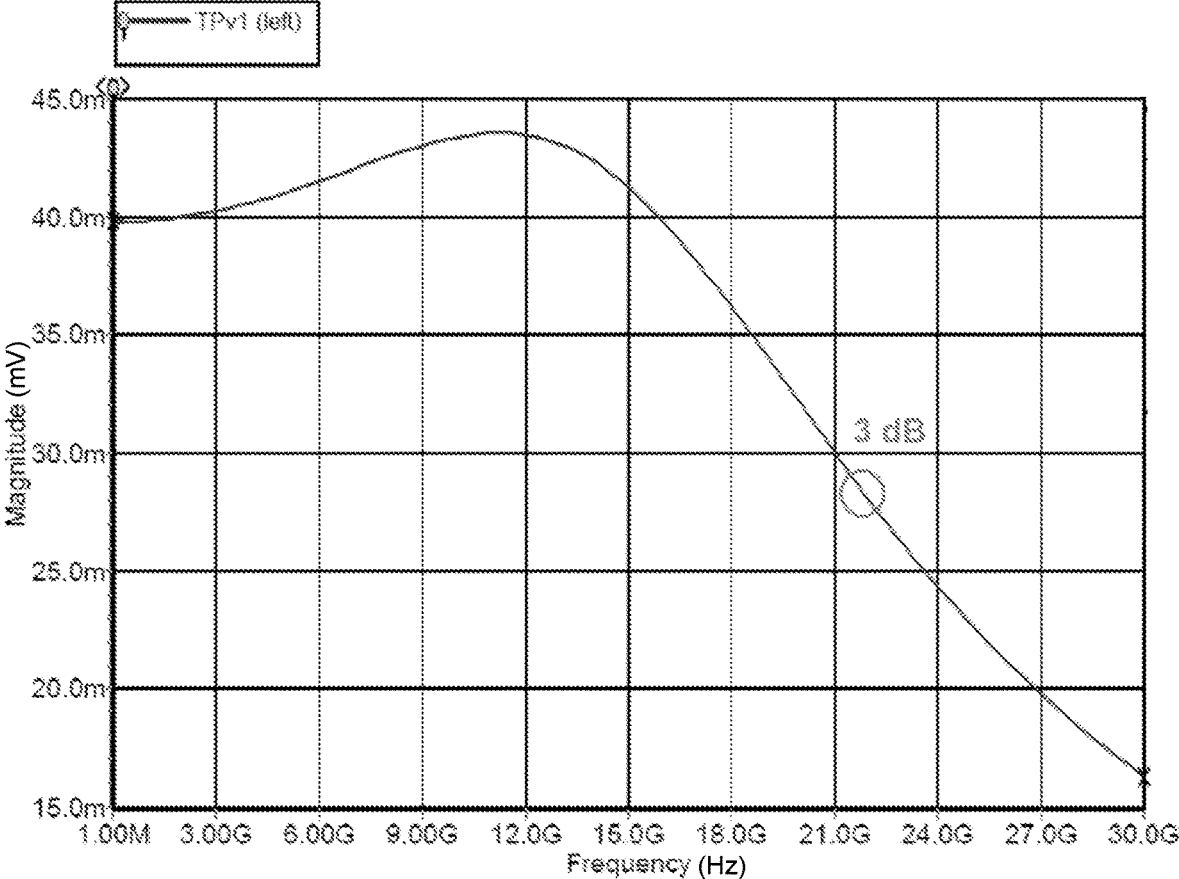
FIG. 6 is a graph of PADL linear magnitude frequency response.

PADL frequency response is investigated using small-signal sinusoidal photocurrent as input. We observe excellent frequency response with mild peaking due to packaging inductor and a 21 GHz 3 dB bandwidth, shown in FIG. 6 which is a graph of PADL linear magnitude frequency response.

Figure 7:
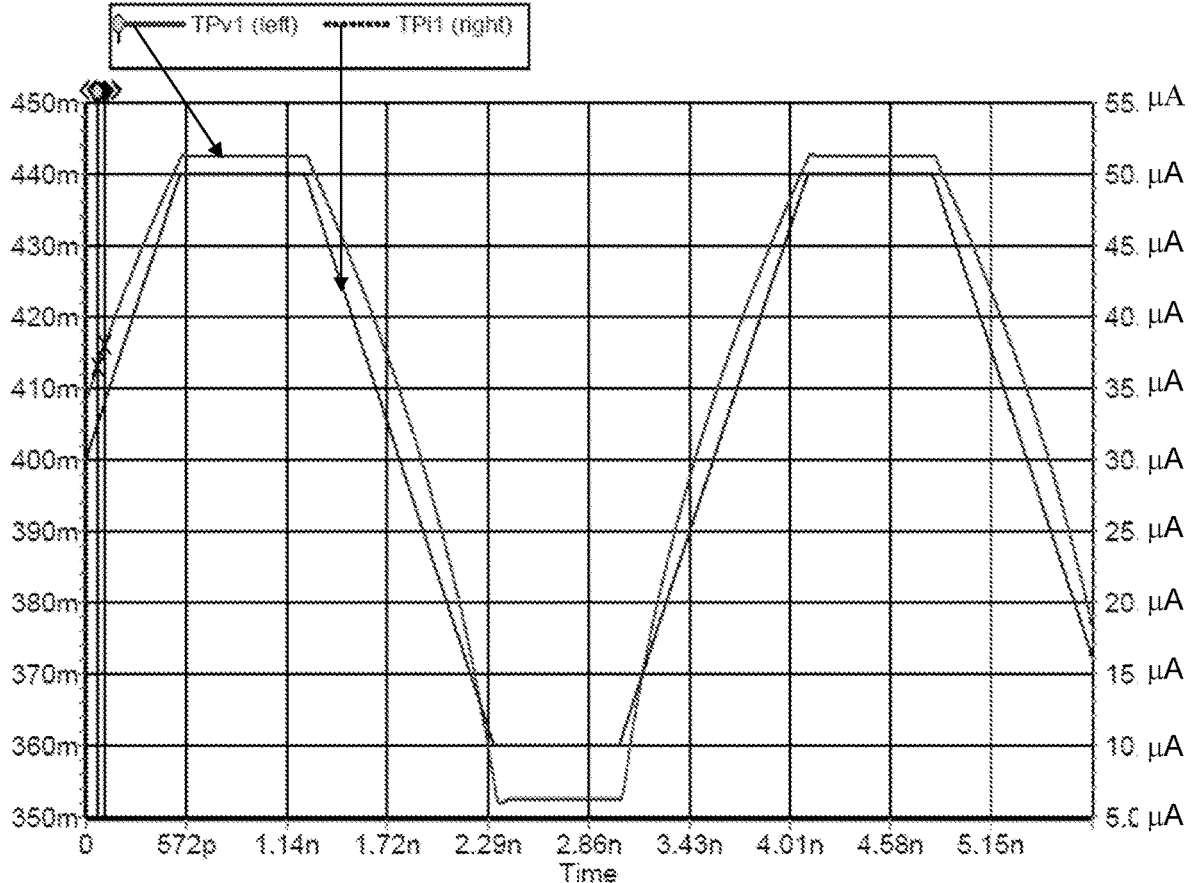
FIG. 7 is a graph of PADL linearity.

PADL linearity is investigated by applying trapezoidal photocurrent slowly varying between 10 uA and 50 uA. This corresponds to −23 dBm to −16 dBm optical average power, assuming on-off keying (OOK) type modulation with finite extinction ratio. The transimpedance is observed to be ~2250 Ohm and we do observe some small nonlinearity in the PADL response, as shown in FIG. 7 which is a graph of PADL linearity.

Figure 8:
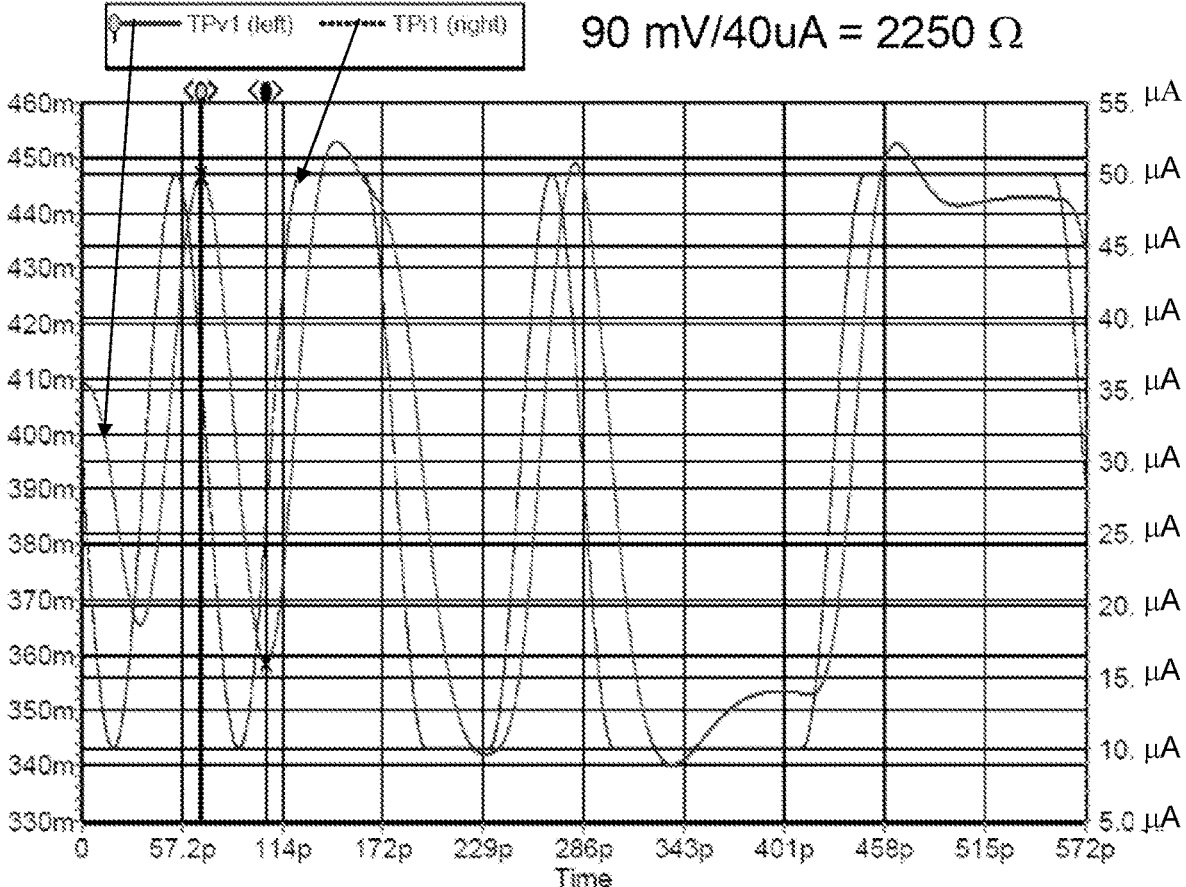
FIG. 8 is a graph of PADL response to a 28 Gbps pseudorandom binary sequence (PRBS) on-off keying (OOK) pattern.

Finally, we investigate PADL response to a pseudorandom binary sequence (PRBS) OOK pattern at 28 Gbps, as shown in FIG. 8 which is a graph of PADL response to a 28 Gbps PRBS OOK pattern. We observe excellent PADL response, with some response peaking attributable to a packaging inductor connecting PD to the PADL and the derivative of the output voltage leaking back through the NMOS transistor gate.

Similar characteristics can be obtained using a PMOS transistor as active dynamic load connected as shown in FIG. 4, which produces inverted voltage response, ~30% higher transimpedance, and ~30% lower bandwidth.

Figure 9:
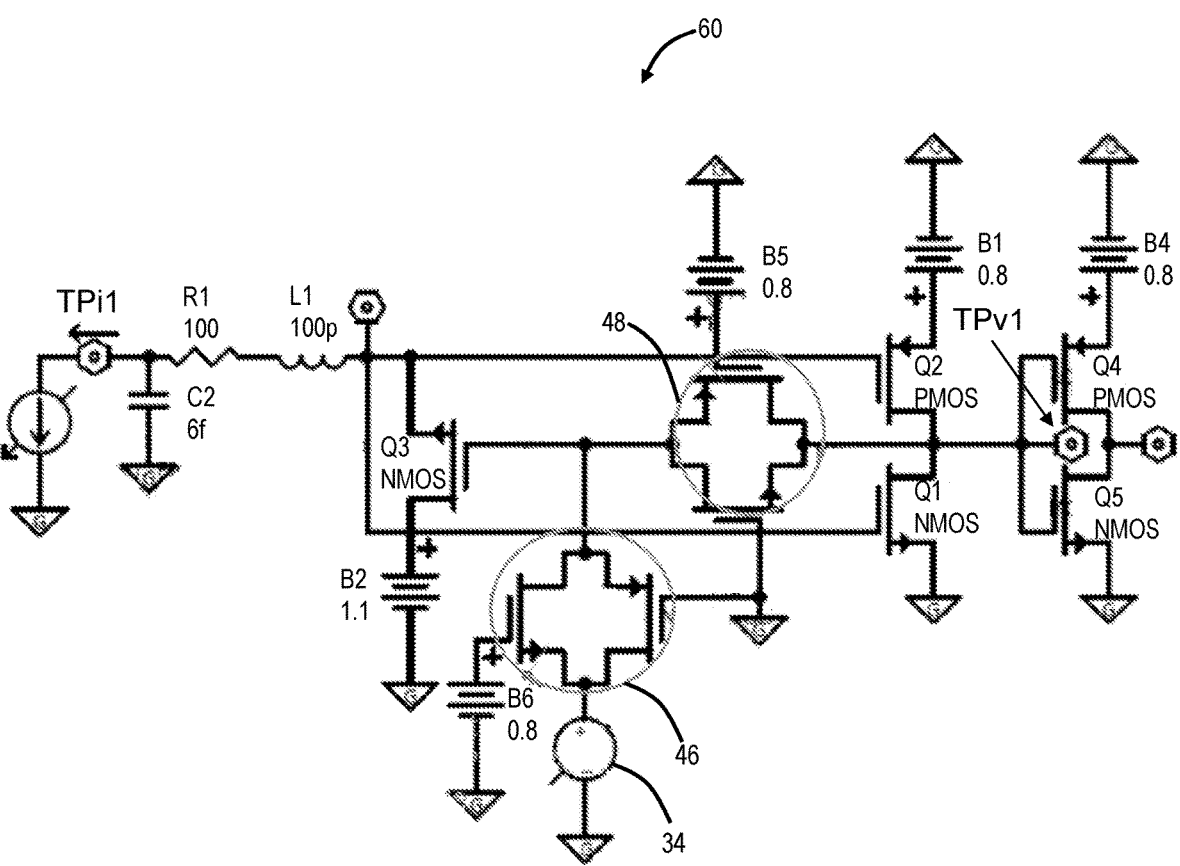
FIG. 9 is a circuit diagram of an example simulated circuit of the dual-mode opto-electronic receiver circuit, for illustrating I&D mode performance.

FIG. 9 is a circuit diagram of an example simulated circuit 60 of the dual-mode opto-electronic receiver circuit 20, for illustrating I&D mode performance. Our circuit demonstrates I&D operation at 3 GBaud, although higher rates are possible. We note that the circuit 60 is the same as the circuit 40 for PADL implementation. The only change is we set PADL feedback transmission gate 48 to "OFF" and I&D Clock input transmission gate 46 to "ON" and apply a sinusoidal clock signal 34 synchronized to the input data.

Figure 10:
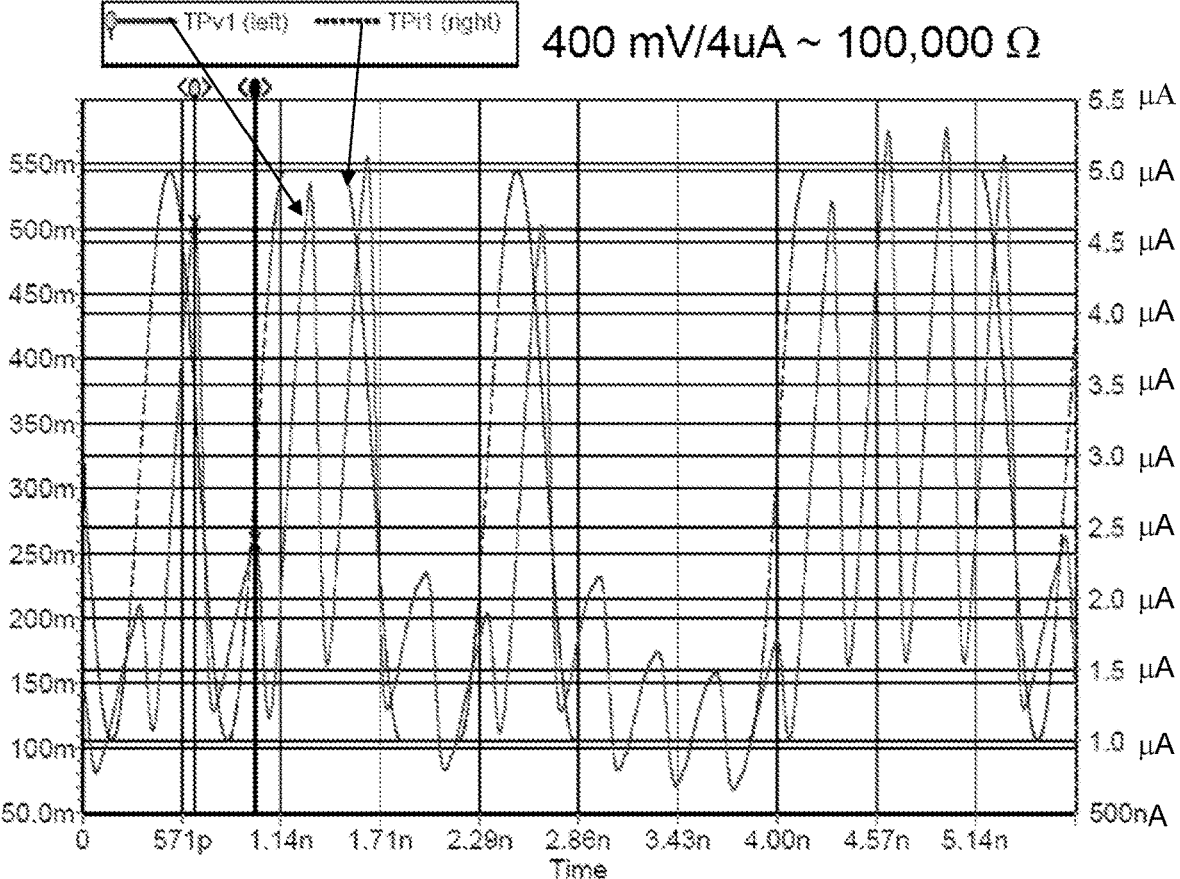
FIG. 10 is a graph of I&D response to 3 Gbps PRBS OOK input.

I&D circuit response to a 3 Gbps OOK input is shown in FIG. 10 which is a graph of I&D response to 3 Gbps PRBS OOK input. The range of input photocurrent is decreased by 10x to 1 uA to 5 uA range, which corresponds to a 20 dB drop in input optical power compared to 28 Gbps PADL operation. However, we see excellent voltage output swing, which corresponds to an effective transimpedance of the I&D circuit of ~100,000 Ohm. This is ~40x higher than the corresponding PADL circuit and illustrates the advantages of the I&D mode. Its effective transimpedance is determined by the circuit input capacitance, which acts as a photocurrent integrator, i.e., output voltage $dV_{out}=I_{pd}/C*dt$.

We see that the output signal has a Return to Zero (RZ) type format, which is characteristic of a "Dump" function. We also observe that due to finite optical extinction ratio used in our simulation "zeros" produce small signal spikes. RZ format is easily converted to NRZ using a D-flip flop circuit using RZ as data input with corresponding Clock signal (not part of shown circuit).

Circuit and Process

In an embodiment, a circuit for use in an optical receiver includes an input configured to receive current from a photodetector; an amplifier stage connected to the input; a feedback path connected to the amplifier stage and to an output, wherein the feedback path includes a feedback element and an operating mode switch configured to set one of a photodetector amplifier with dynamic load (PADL) mode and an integrate-and-dump (I&D) mode; and a first transmission gate (48) connects/disconnects voltage output and gate of transistor Q3 (44), a second transmission gate (46) connects/disconnects gate of transistor Q3 (44) and clock signal, and the first transistor Q1 and the second transistor Q2 connected to one another for the output.

The operating mode switch, in the PADL mode, can connect the feedback element to the output, and, in the I&D mode, can connect the feedback element to a clock signal which determines a sampling window. The clock signal can be synchronized to incoming data on the input. The feedback element can be a P-channel metal-oxide-semiconductor (PMOS) transistor or a N-channel metal-oxide-semiconductor (NMOS) transistor. The operating mode switch can be a complementary metal-oxide-semiconductor (CMOS) transmission gate. The amplifier stage cam be a complementary metal-oxide-semiconductor (CMOS) inverter.

The PADL mode is for higher baud operation than the I&D mode. The operating mode switch can be set based on a data rate of the optical receiver. In an embodiment, the optical receiver can be in a satellite optical modem that is configured to operate over a wide range of data rate operation, such that the operating mode switch is set based on the data rate operation. In another embodiment, the optical receiver can be in a terrestrial free space optical link having variable channel impairments, such that the operating mode switch is set based on the variable channel impairments. In a further embodiment, the optical receiver can be in an optical time domain reflectometer (OTDR) that operates over a range of optical sampling pulse widths, such that the operating mode switch is set based on the optical sampling pulse widths. The optical receiver can be in an optical modem.

FIG. 11 is a flowchart of a process 80 for operating the dual-mode opto-electronic receiver circuit in an optical receiver. The process 80 includes receiving current from a photodetector associated with an optical receiver (step 82); converting the current into voltage (step 84); configuring a feedback path after the current-to-voltage converting in one of photodetector amplifier with dynamic load (PADL) mode and an integrate-and-dump (I&D) mode, wherein the configuring is based on a baud rate of the optical receiver (step 86); and providing an output that includes a voltage based on the amplified current, the output being adjusted by the feedback path (step 88).

CONCLUSION

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

REFERENCES

1. R. P. Jindal, "Silicon MOS amplifier operation in the integrate and dump mode for gigahertz band lightwave communication systems," Journal of Lightwave Technology, vol. 8, no. 7, pp. 1023-1026 July 1990.
2. S. Sidiropoulus and M. Horowitz, "Current Integrating Receivers for High Speed System Interconnects," IEEE Custom Integrated Circuits Conference—CICC, May 1995.
3. A. Emami-Neyestanak, et al., "A 1.6 Gb/s, 3 mW CMOS Receiver for Optical Communication," Symposium on VLSI Circuits—VLSIC, 2002, pp. 84-88.
4. A. Emami-Neyestanak, et al., "CMOS Transceiver with Baud Rate Clock Recovery for Optical Interconnects," Symposium on VLSI Circuits—VLSIC, 2004, pp. 410-413.
5. S. Palermo, et al., "A 90 nm CMOS 16 Gb/s Transceiver for Optical Interconnects," IEEE Journal of Solid-State Circuit, vol. 43, no. 5, pp. 1235-1246 May 2008.
6. M. Georgas, at al., "Addressing link-level design tradeoffs for integrated photonics interconnects," IEEE Custom Integrated Circuits Conference—CICC, 2011.
7. M. Georgas, at al., "A monolithically-integrated optical receiver in standard 45-nm SOI," IEEE Journal of Solid-State Circuit, vol. 47, no. 7, pp. 1693-1702 May 2012.
8. T. D. Gathman and J. F. Buckwalter, "A 45-nm SOI CMOS Integrate-and-Dump Optical Sampling Receiver," IEEE Transactions on Circuits and Systems—I: Regular Papers, vol. 60, no. 2, February 2013.
9. C. R. Giles and J. M. Kahn, "1 Gbit/s integrate-and-dump filter for digital communication systems," Electron. Lett., vol. 25, no. 3, pp. 212-214, 2 Feb. 1989.
10. Eduard Sackinger, "The Transimpedance Limit," IEEE Transactions on Circuits and Systems—I: Regular Papers, vol. 57, no. 8, August 2010.

What is claimed is:

1. A circuit for use in an optical receiver, the circuit comprising:
   an input configured to receive current from a photodetector;
   an amplifier stage connected to the input; and
   a feedback path connected to the amplifier stage and to an output, wherein the feedback path includes a feedback element and an operating mode switch configured to set one of photodetector amplifier with dynamic load (PADL) mode and an integrate-and-dump (I&D) mode, wherein the feedback element comprises an active dynamic load transistor configured to terminate the current from the photodetector, and wherein the operating mode switch is coupled to a control terminal of the active dynamic load transistor and is configured to selectively couple the control terminal to the output in the PADL mode and to a clock signal in the I&D mode such that the active dynamic load transistor functions as a sampling gate in the I&D mode.

2. The circuit of claim 1, wherein the operating mode switch, in the PADL mode, connects the feedback element to the output, and, in the I&D mode, connects the feedback element to a clock signal which determines a sampling window.

3. The circuit of claim 2, wherein the clock signal is synchronized to incoming data on the input.

4. The circuit of claim 1, wherein the feedback element is a P-channel metal-oxide-semiconductor (PMOS) transistor.

5. The circuit of claim 1, wherein the feedback element is a N-channel metal-oxide-semiconductor (NMOS) transistor.

6. The circuit of claim 1, wherein the operating mode switch is a complementary metal-oxide-semiconductor (CMOS) transmission gate.

7. The circuit of claim 1, wherein the amplifier stage is a complementary metal-oxide-semiconductor (CMOS) inverter.

8. The circuit of claim 1, wherein the PADL mode is for higher baud operation than the I&D mode.

9. The circuit of claim 1, wherein the operating mode switch is set based on a data rate of the optical receiver wherein the operating mode switch is configured to set the PADL mode for a higher data rate and to set the I&D mode for a lower data rate.

10. The circuit of claim 1, wherein the optical receiver is in a satellite optical modem that is configured to operate over a wide range of data rate operation, such that the operating mode switch is set based on the data rate operation.

11. The circuit of claim 1, wherein the optical receiver is in a terrestrial free space optical link having variable channel impairments, such that the operating mode switch is set based on the variable channel impairments.

12. The circuit of claim 1, wherein the optical receiver is in an optical time domain reflectometer (OTDR) that operates over a range of optical sampling pulse widths, such that the operating mode switch is set based on the optical sampling pulse widths.

13. An optical modem comprising:
an optical front end configured to provide a current to an adjustable bandwidth current-to-voltage converter, the adjustable bandwidth current-to-voltage converter includes
an amplifier stage configured to receive the voltage; and
a feedback path connected to the amplifier stage and to an output, wherein the feedback path includes a feedback element and an operating mode switch configured to set one of a photodetector amplifier with dynamic load (PADL) mode and an integrate-and-dump (I&D) mode wherein the feedback element comprises an active dynamic load transistor configured to terminate the current from the optical front end, and wherein the operating mode switch is coupled to a control terminal of the active dynamic load transistor and is configured to selectively couple the control terminal to the output in the PADL mode and to a clock signal in the I&D mode such that the active dynamic load transistor functions as a sampling gate in the I&D mode.

14. The optical modem of claim 13, wherein the PADL mode is for higher baud operation than the I&D mode.

15. The optical modem of claim 13, wherein the operating mode switch is set based on a data rate of the optical modem, wherein the operating mode switch is configured to set the PADL mode for a higher data rate and to set the I&D mode for a ower data rate.

16. The optical modem of claim 13, wherein the optical modem is in a satellite and is configured to operate over a wide range of data rate operation, such that the operating mode switch is set based on the data rate operation.

17. The optical modem of claim 13, wherein the optical modem is in a terrestrial free space optical link having variable channel impairments, such that the operating mode switch is set based on the variable channel impairments.

18. The optical modem of claim 13, wherein the optical modem is in an optical time domain reflectometer (OTDR) that operates over a range of optical sampling pulse widths, such that the operating mode switch is set based on the optical sampling pulse widths.

19. A method comprising steps of:
receiving current from a photodetector associated with an optical receiver;
converting the current into voltage;
configuring a feedback path after the converting in one of photodetector amplifier with dynamic load (PADL) mode and an integrate-and-dump (I&D) mode, wherein the configuring is based on a baud rate of the optical receiver; and
providing an output that includes a voltage converted from current, the output being adjusted by the feedback path,
wherein the configuring comprises, in the PADL mode, coupling a control terminal of an active dynamic load transistor to the output such that an output voltage controls a conductance of the active dynamic load transistor to terminate the current from the photodetector, and, in the I&D mode, coupling the control terminal of the active dynamic load transistor to a clock signal such that the active dynamic load transistor functions as a sampling gate and a sampling window is determined by the clock signal.

20. The method of claim 19, wherein the PADL mode is for higher baud operation than the I&D mode.

* * * * *